United States Patent [19]

Gray

[11] Patent Number: 5,526,849

[45] Date of Patent: Jun. 18, 1996

[54] FLEXIBLE DUCT

[76] Inventor: William R. Gray, 206 Stoney Point Trail, Webster, N.Y. 14580

[21] Appl. No.: 919,624

[22] Filed: Jul. 24, 1992

Related U.S. Application Data

[63] Continuation of Ser. No. 626,275, Dec. 12, 1990, abandoned.

[51] Int. Cl.$^6$ ..................................................... F16L 11/08
[52] U.S. Cl. ........................ 138/133; 138/134; 138/138; 138/150
[58] Field of Search ........................... 138/129, 132–134, 138/138, 122, 103, 150, 172

[56] References Cited

U.S. PATENT DOCUMENTS

| | | | |
|---|---|---|---|
| 910,770 | 1/1909 | Armstrong | 138/138 |
| 1,052,861 | 2/1913 | Swanson et al. | 138/132 |
| 2,683,466 | 7/1954 | Guiles | 138/133 |
| 2,913,011 | 11/1959 | Noyes et al. | 138/122 |
| 3,116,759 | 1/1964 | Webb | 138/129 |
| 3,300,571 | 1/1967 | Downey et al. | 138/131 |
| 3,860,043 | 1/1975 | Kutnyak et al. | 138/172 |
| 4,098,298 | 7/1978 | Vohrer | 138/129 |
| 4,196,755 | 4/1980 | Kutnyak et al. | 138/129 |
| 4,224,463 | 9/1980 | Koerber et al. | 138/129 |
| 4,308,895 | 1/1982 | Greco | 138/132 |
| 4,599,784 | 7/1986 | Canu, Jr. et al. | 138/132 |
| 4,899,787 | 2/1990 | Ouchi et al. | 138/131 |

FOREIGN PATENT DOCUMENTS

| | | | |
|---|---|---|---|
| 8861 | 5/1893 | United Kingdom | 138/133 |

Primary Examiner—David Scherbel
Assistant Examiner—James F. Hook
Attorney, Agent, or Firm—Cumpston & Shaw

[57] ABSTRACT

A flexible duct and method for making the duct are disclosed. The duct includes an inner wall bonded to an outer wall, so as to sandwich a wire resilient helix and a yarn helix therebetween. The yarn helix is axially displaced from the wire helix so that the turns of the yarn helix are intermediate of the turns of the wire helix. The method of manufacturing the duct includes forming the wire and yarn helix about the inner wall and bonding the outer wall to the inner wall so as to sandwich the helix between the inner and outer walls.

16 Claims, 5 Drawing Sheets

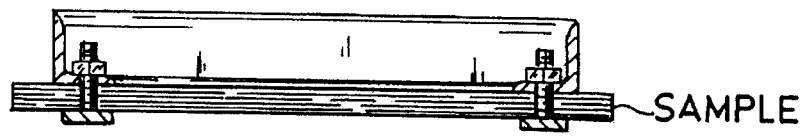
FIG.10B
FIG.10C
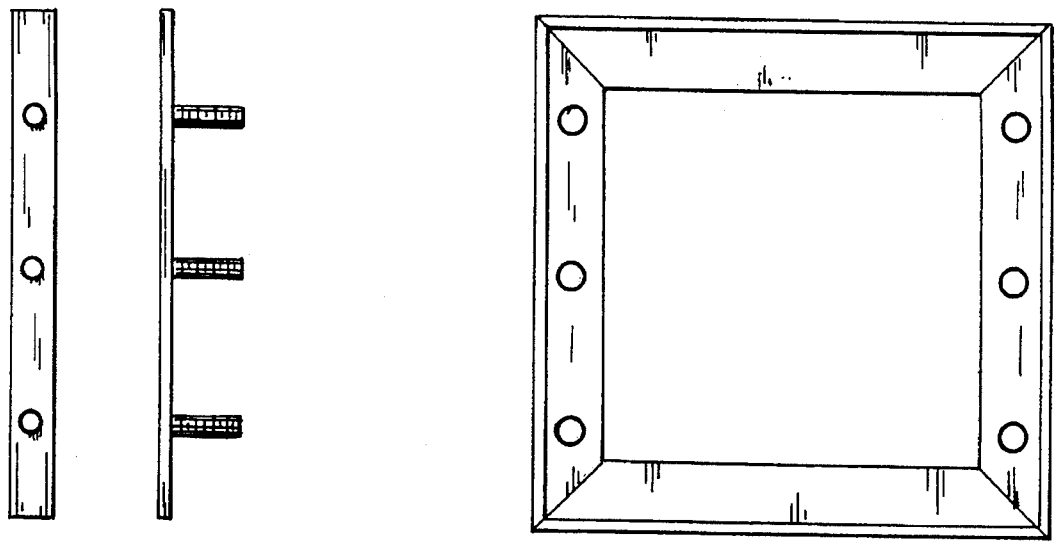
FIG.10D
FIG.10A
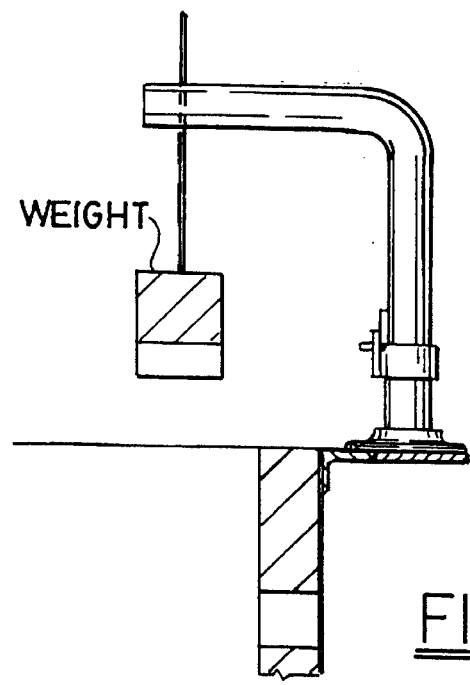
FIG.11

FLEXIBLE DUCT

The present application is a continuation of U.S. Ser. No. 07/626,275 filed Dec. 12, 1990 abandoned.

FIELD OF THE INVENTION

The present invention relates to flexible ducts for conducting fluids, and more particularly, to a flexible duct which incorporates a resilient helix and a yarn helix between an inner and an outer wall.

DESCRIPTION OF RELATED ART

Flexible ducts are used to transport fluids such as heated, cooled or exhaust air. As the flexible ducts are employed in buildings, the ducts are subject to local building codes and regulations. In order to meet some codes, the ducts must be able to withstand a specified flame penetration test.

To satisfy the flame penetration tests, the ducts are employed with a plurality of concentric components which are secured within a retaining jacket. The components include the flexible duct, a reinforcing layer, an insulative layer and the retaining jacket. Although the components employed in a given system are dictated by design considerations, the codes set forth the minimum standards which must be satisfied.

Typically, the flexible duct has a tubular construction formed by a wire helix between two pliable layers. The duct provides the channel through which the fluid travels.

To provide a resistance to flame penetration, the reinforcing layer is wrapped about the duct. The reinforcing layer is a fiberglass netting, or scrim. The scrim is wrapped about the outside of the flexible duct so as to encircle the duct. The scrim provides the necessary resistance to flame penetration to satisfy some building codes.

The insulative layer is a fiberglass blanket wrapped about the scrim and the duct. The insulative layer ensures the thermal integrity of the transported fluid. The insulative capacity of the fiberglass blanket is determined by the fluid to be transported and the permissible heat transfer rate from the fluid.

The retaining jacket is a plastic sheath wrapped about the insulative layer, the reinforcing layer and the duct so as to provide an outer housing which retains the components in the proper orientation. As each component is individually aligned and then disposed within the retaining jacket, the assembly process of the four component system is time consuming and expensive.

Therefore, the need exists for a flexible duct system that is capable of meeting the applicable building codes, while having a reduced number of components. A need exists for a single component that can perform the function of two components, thereby eliminating the manufacture and assembly of a component. A further need exists for an efficient method of manufacturing such a flexible duct.

SUMMARY OF THE INVENTION

A flexible duct which includes a resilient helix and a yarn helix disposed between an inner and an outer wall is disclosed. The resilient helix provides structural rigidity to form the tubular construction of the duct while permitting the duct to flex about multiple axes.

The yarn helix may be axially displaced relative to the resilient helix so that the turns of the yarn helix are intermediate of the turns of the resilient helix. The inner and outer walls are bonded to each other so as to sandwich the resilient helix and the yarn helix between the walls.

Preferably, the flexible duct meets or exceeds Underwriter's Laboratories Inc. Nov. 20, 1990, 181 Standard Flame Penetration Test for Class 1 Factory Made Air Ducts and Air Connectors.

A method for forming the flexible duct is disclosed. The method includes forming the resilient helix and the yarn helix about the inner wall. The outer wall is then bonded to the inner wall so as to sandwich the resilient and the yarn helix between the inner and outer walls.

BRIEF DESCRIPTION OF THE DRAWINGS

FIG. 10 shows the manner in which the tube to be tested is placed in the testing apparatus.

FIG. 11 shows the manner in which the test is conducted on a tube section.

DETAILED DESCRIPTION OF THE PREFERRED EMBODIMENT

Figure 1:
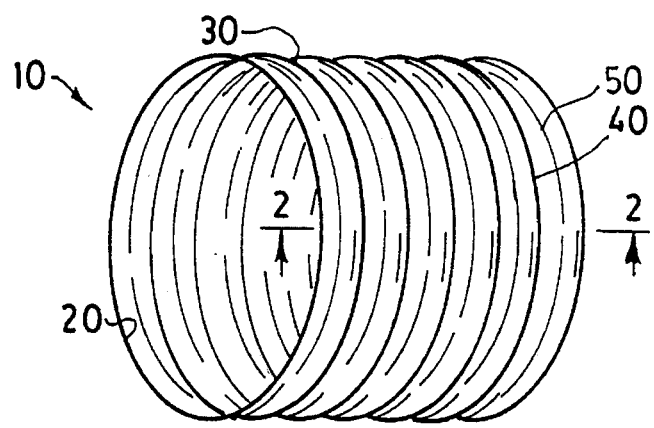
FIG. 1 is a perspective view of the duct showing the tubular construction.

As shown in FIG. 1, the flexible duct 10 includes an inner wall 20, an outer wall 30, a resilient helix 40, and a yarn helix 50.

Figure 2:
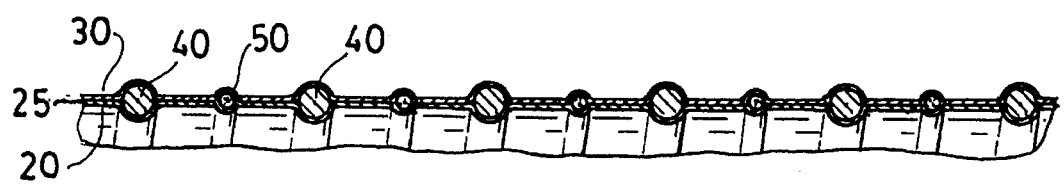
FIG. 2 is a cross-sectional view of the duct taken along lines 2—2 of FIG. 1.
Figure 3:
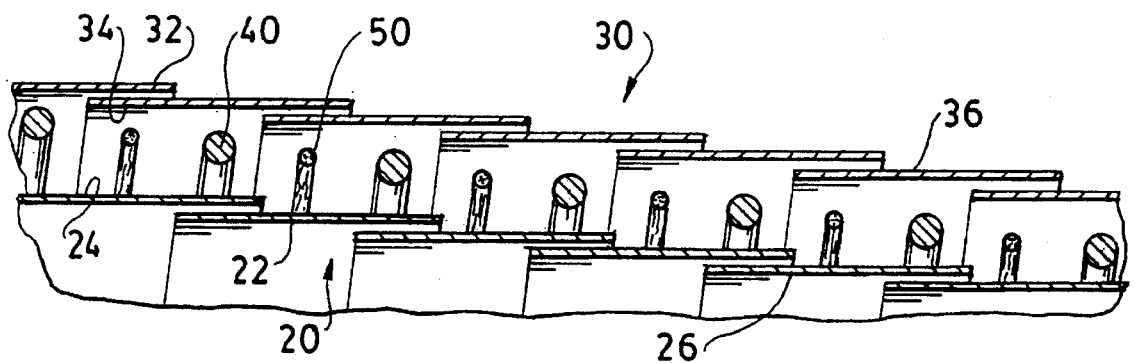
FIG. 3 is a cross-section of the duct wall showing the construction of the wall.
Figure 4:
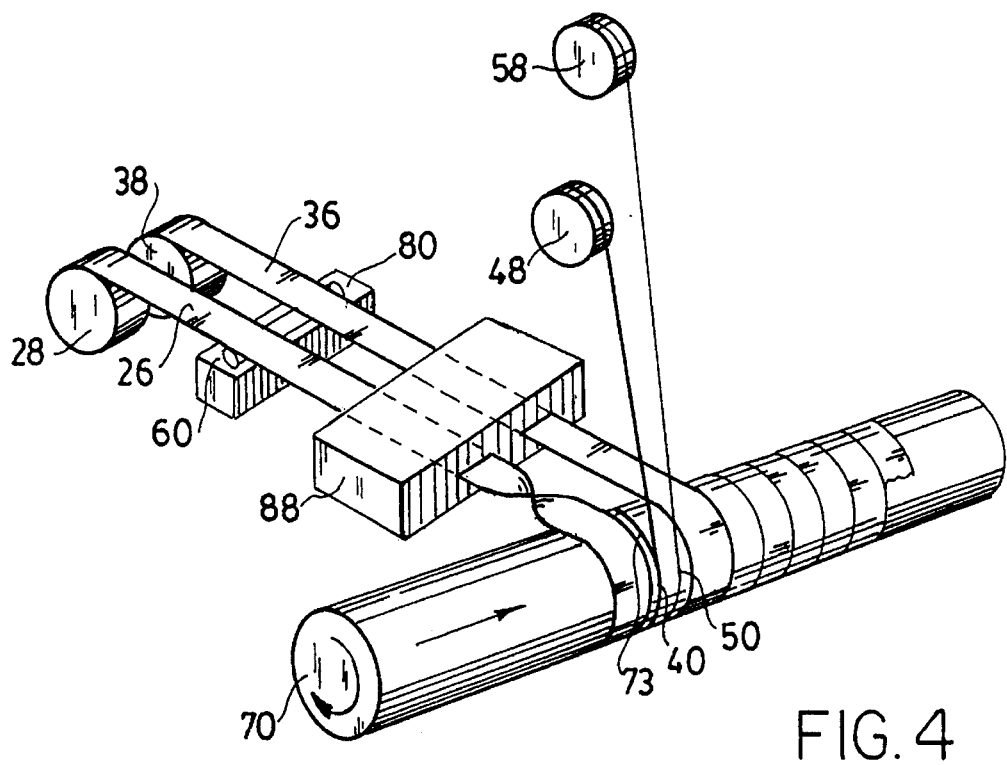
FIG. 4 is a perspective view of an apparatus for forming the duct.
Figure 5:
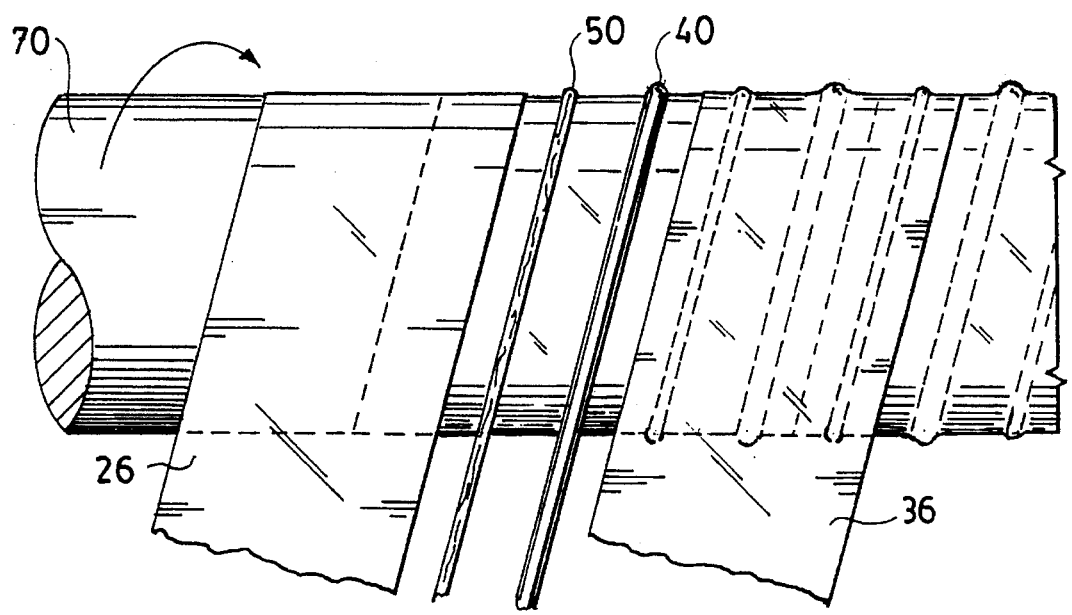
FIG. 5 is a side elevational view showing the formation of the duct.

Referring to FIG. 2, the inner wall 20 is bonded to the outer wall 30 along a common interface 25 such that the only interruption in the common interface is the yarn helix 50 and the resilient helix 40. The inner and outer walls 20, 30 may be a continuous sheet of material, or may be formed from a plurality of smaller sections bonded together to form a continuous surface. As shown in FIG. 3, the inner and outer walls 20, 30 are formed from a spiral winding of tape, such that consecutive turns of the spiral partially overlap and are bonded together to form a substantially continuous wall.

The walls 20, 30 may comprise any of a variety of materials, such as polyester or other thermoplastics. The walls have a thickness of approximately 0.00055 inches. Preferably, polyester tapes are used to form the inner and outer walls. The tapes are manufactured by Sunkyong of America, or DuPont.

The inner wall has an internal surface 22 exposed to the fluids, and an outer bonding surface 24. At least the inner wall 20 must be substantially impervious to penetration of the fluid transported in the duct 10. The outer wall 30 has an exterior surface 32 and a mating surface 34 such that the mating surface is bonded to the bonding surface 24 of the inner wall 20. As the outer wall 30 is bonded to the inner wall 20, the walls should be formed of compatible materials so that an integral bond between the walls may be achieved. Preferably, the outer wall 30 is the same material is the inner wall, and provides a second substantially impervious barrier to the penetration of the conducted fluid. The outer wall 30 may be constructed in the manner described for the inner wall.

The inner and outer walls 20, 30 are bonded together to form a substantially integral structure. The bonding of the inner wall to the outer wall may be achieved by adhesives or thermal fusion. In addition, it is preferable that the resilient helix 40 and the yarn helix 50 are also bonded to the inner and the outer walls. Preferably, the bonding is achieved by an adhesive such as Durolam-38-5031 manufactured by National Starch and Chemical Co. or H. B. Fuller PD 0661. Preferably, the inner wall 20 and outer wall 30 are bonded together so that gaps or voids at the junction of the walls 20, 30 and the helixes 40, 50 are minimized. The walls 20, 30 and helixes 40, 50 form a substantially one piece duct.

The resilient helix 40 provides the structural rigidity of the duct 10 and exhibits sufficient elasticity to permit substantial expansion and contraction between consecutive turns of the helix without incurring stress failures. Preferably, the resilient helix 40 is formed of metallic wire such as aluminum, steel or an alloy. A preferred wire for the helix is galvanized MB spring wire as manufactured by Bekeart International. The diameter of the wire is dictated by the size of the duct. Generally, the larger the duct diameter the larger the wire diameter used to form the resilient helix. For a duct diameter of 6 inches, a preferred wire diameter is 0.041 inches.

Figure 7:
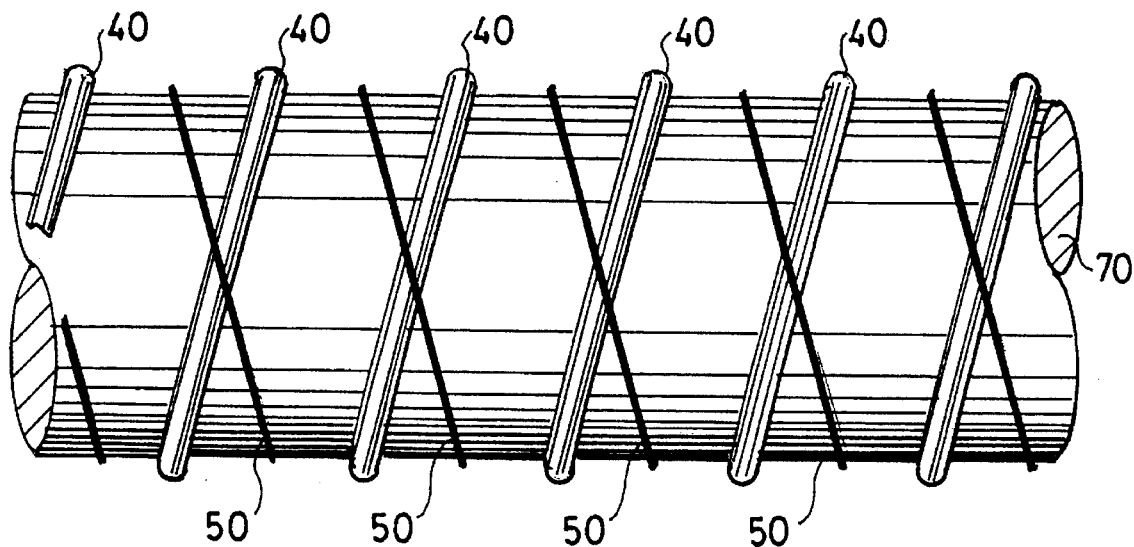
FIG. 7 is a partial cross-sectional view of a furnace for testing flame penetration.
Figure 8:
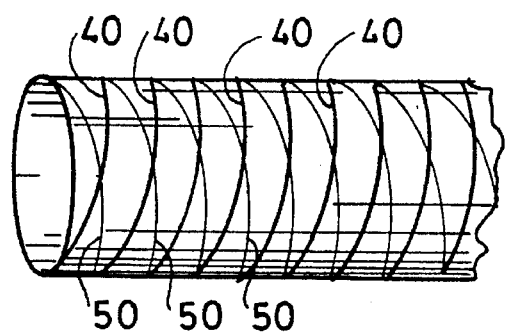
FIG. 8 is an elevational view of a sample holding frame assembly for the flame penetration test.

In a preferred embodiment, the yarn helix 50 is axially displaced from the resilient helix 40 so that the turns of the yarn helix are intermediate of the turns of the resilient helix. Alternatively, as shown in FIGS. 7 and 8, the yarn helix 50 and the resilient helix 40 may be disposed to spiral in opposite directions, so that the resilient helix 40 repeatedly crosses the yarn helix 50. Preferably, the yarn helix 50 is bonded to the inner wall 20 and the outer wall 30. The yarn helix 50 is concentric with the resilient helix 40 and has a diameter substantially equal to the diameter of the resilient helix 40. The yarn helix 50 may be formed from a single thread or may be a plurality of individual threads twisted together to form a single yarn.

Preferably, the yarn helix 50 is formed of a fire resistant material which provides a flexible tendon intermediate of the turns of the resilient helix 40 and resists combustion upon exposure to flame or extreme temperature. The degree of resistance to fire is dictated by the applicable codes and regulations. The yarn helix 50 may be formed from a variety of materials, such as plastic, paper, fiberglass, asbestos. Preferably, the yarn helix 50 is a non-metallic fire resistant fiberglass yarn manufactured by Owens Corning S-2 CG 75 1/0 1.0Z 636.

Although the duct 10 is shown having a single yarn 50 between consecutive turns of the resilient helix 40, the duct may have a plurality of yarn helixes between consecutive turns of the resilient helix. For example, there may be a single resilient helix 40 and three yarn helixes between the inner and the outer walls.

The number of yarn helixes 50 is limited by the increase in cost of manufacture and the reduced bonding area between the inner and the outer walls 20, 30. As the area of the yarn material between the inner and outer walls 20, 30 increases, the bonding area between the inner wall 20 to the outer wall 30 decreases, thereby reducing the strength of the duct 10. Preferably, a sufficient number of yarn helixes 50 so as to satisfy Underwriters Laborities Inc. 181 Standard for Safety, for Factory-made Air Ducts and Air Connectors, Flame Penetration Section, 7th Edition, as revised Nov. 20, 1990, and as set forth herein:

9. Flame Penetration Test

General:

9.1 Materials for the fabrication of Class 0 and Class 1 air ducts shall retard the passage of flame, as described in paragraph 9.2, for a period of at least 30 minutes when tested in accordance with the method specified in paragraphs 9.4–9.15.

9.2 The sample shall withstand the flame-penetration test without collapse, evidence of perforation to an extent which would allow the direct passage of flame or gases, and without ignition occurring on the surface of the sample exterior to the combustion zone of the test furnace.

9.3 The test series shall consist of a set of three samples.

Test Equipment:

9.4 Flame-penetration tests are to be conducted using a refractory-lined gas-fired combustion chamber open at the top. The sample to be tested is to form the top of the chamber, thus forming a test furnace as shown in FIG. 9.

Figure 9B:
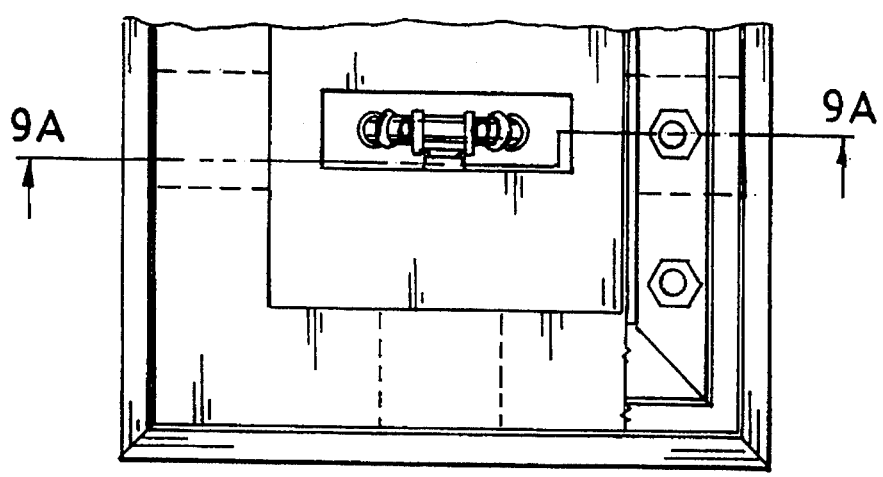
FIG. 9 is a side elevational view of a typical support configuration for the flame penetration test.
Figure 9A:
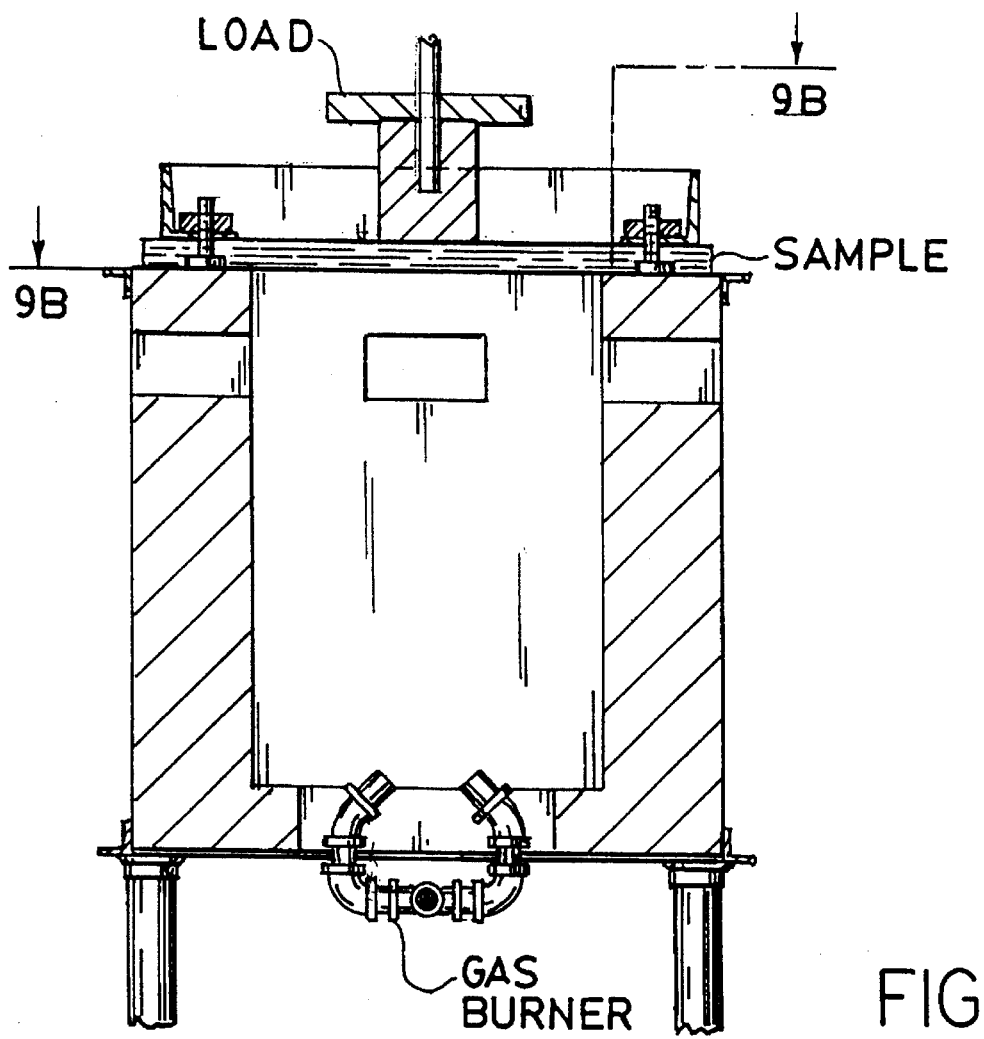

9.5 The furnace is to be equipped with a dual-outlet gas burner composed of pipe fittings as shown in FIG. 9. The gas burner is not to have any means for premixing of gas and combustion air.

9.6 The furnace is to be vented directly into the room space in which it is located by means of the four vent openings shown. No dampers or regulators are to be employed in openings provided for inlet of combustion air or for venting. The furnace is to be lined as shown with high-duty regular type fireclay brick having a density of 125–135 pounds per cubic foot (2002–2162 kg/m$^3$), Standard for Classification of Fireclay and High Alumina Refractory Brick, ANSI/ASTM C2.7-70. (For example, A. P. Green, "Empire DP.")

9.7 The furnace is to be equipped with a gas burner as detailed in FIG. 9 to burn technical grade or purer methane (bottled) gas fuel having a heating value of 1000–1050 Btu per cubic foot (37,642–39,525 kJ/m$^3$). A flanged union incorporating a thin plate orifice is to be sized to flow 53 cubic feet (1.5 m$^3$) per hour (nominal) of methane gas at a pressure of 3-½ inches water column (870 Pa).

9.8 The room in which the rest furnace is to be located is to be large in relation to the furnace and ventilated to provide adequate air for combustion. Ventilation is to be accomplished without appreciable air movement in the vicinity of the furnace.

Sample Preparation:

9.9 Samples are to be prepared from previously untested materials. Samples of flexible ducts are to be cut from ducts having a minimum inside diameter of at least 12 inches (305 mm). Rigid duct samples are to be prepared in 24 inch (610 mm) flat squares. Materials used in the construction of the sample ducts are to be identical to those used in regular finished production. Exception: If a duct at least 12 inches in diameter is not produced, then the largest diamater duct that is produced is to be used for the test.

9.10 If the sample is a flexible air duct that incorporates a seam in the insulation, the sample is to be prepared with the seam at the center of the test frame. Exception: Flexible air ducts which maintain insulation and seam overlaps of not less than 1 inch (25.4 mm) after being subjected to the Bending Test of Section 8 shall have the sample cut from an area containing no seam.

Test Method:

9.11 The material surface considered to be the outside surface of the air duct is to be the surface exposed to the flame during the test. Test samples are to be mounted in a frame fabricated as shown in FIG. 10. Core wires are to be placed so that they run in the direction from one of the sides of the steel frame assembly (see FIG. 10) containing hold down nuts to the other side of the steel frame assembly containing hold down nuts. The steel plate is to be tightened against the upper frame so that the sample is held firmly in place throughout the test duration.

9.12 The test sample is to be subjected during the test to a static load of 2 pounds-mass per square inch (0.13 kg/cm$^2$) over a bearing surface on the sample of 1 by 4 inches (25.4 by 102 mm), located at the geometric center and rotated to any position determined to be most critical for penetration on the upper surface of that part of the sample exposed to the flame. See FIG. 11.

9.13 Prior to the beginning of a test series, the furnace is to be fired for a period of at least 2 hours, using a section of calcium silicate board that is 18 pounds per cubic feet (288 kg/m$^3$) to form the top of the furnace combustion chamber. The input to the gas burner is to be adjusted by means of a pressure regulator ahead of the thin plate orifice to obtain a fuel input of 54,500±500 Btu (958±8.8 kW) per hour. Minor adjustments are to be made during this and any subsequent preheating period to maintain this fuel input. For each succeeding test to be conducted immediately following a test, the calcium silicate board is to be replaced on the furnace and the furnace fired for at least 1 hour before beginning the next test. Natural gas may be used for the 2-hour and 1-hour firing periods.

9.14 At the end of the preheating period, the calcium silicate board is to be removed and the air duct test sample immediately substituted in its place. The static load is to be placed on the sample 3 seconds after the test sample is in place. The gas input to the furnace is not to be disturbed during this changeover and any subsequent test period.

9.15 The test is to be continued for a period of 30 minutes. The test period is to be measured from the time the static load is applied to the test sample.

In a preferred embodiment, the yarn helix 50 and the resilient helix 40 are sandwiched between the inner wall 20 and the outer wall 30 so that the helixes do not cross over one another. The pitch of the yarn and resilient helixes 50, 40 are equal so that each unit length of duct includes the same number of turns of the resilient and the yarn helixes. The helixes 40, 50 spiral, or run in the same direction, so that the turns of the respective helixes do not cross each other.

Figure 6:
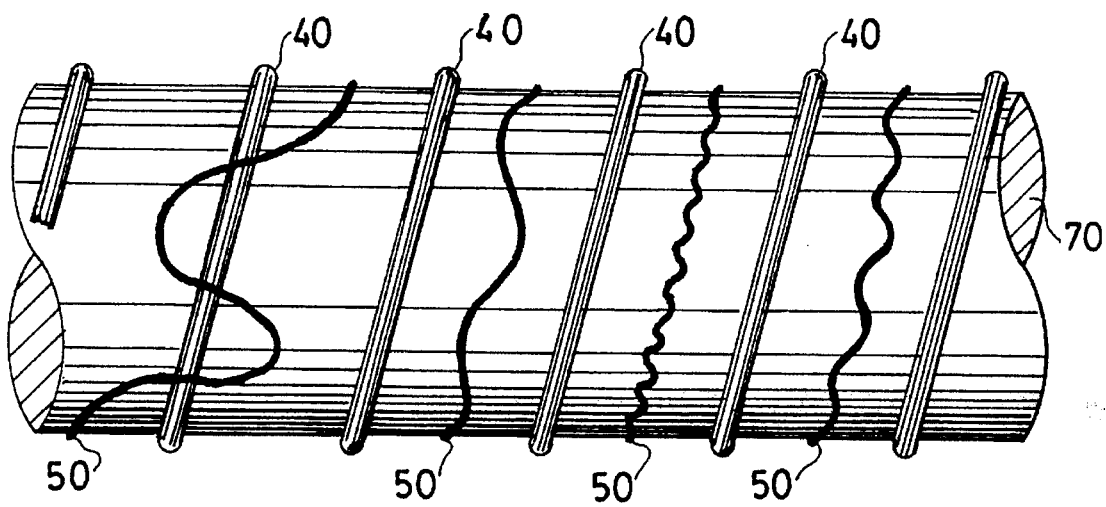
FIG. 6 is a side elevational view of a portion of the duct showing alternative configurations of the yarn helix.

Referring to FIG. 6, the yarn helix 50 may be formed by an oscillating applicator so that the turns of the yarn helix include an oscillating component. The amplitude of the oscillation may be adjusted from approximately 0.25 inches to across consecutive turns of the resilient helix 40, such that the yarn helix 50 intersects the resilient helix. As the yarn helix 50 oscillates relative to the resilient helix 40, the oscillating motion is superimposed upon the helical winding of the yarn helix, wherein the helixes 40, 50 spiral in the same direction. The yarn helix 50 may oscillate within consecutive turns of the resilient helix, or may oscillate across the resilient helix.

While the oscillations of the yarn helix 50 may intersect the resilient helix 40, the yarn helix spirals in the same direction as the resilient helix. The oscillation may be uniform throughout the length of the duct, or may be varied. In addition, the oscillations may be imparted to each yarn helix, or selected helixes when a plurality of yarn helixes are employed. In an alternative embodiment, shown in FIG. 8, the yarn helix 50 may cross the resilient helix 40, such that the yarn helix spirals in the opposite direction of the resilient helix. The opposite spiralling yarn helix 50 may also include an oscillating component.

METHOD OF MANUFACTURE

The flexible duct 10 is manufactured by forming the inner wall 20 upon a rotating mandrel 70, forming the resilient helix 40 and the yarn helix 50 upon the inner wall 20, and bonding the outer wall 30 to the inner wall so as to sandwich the resilient and yarn helixes between the inner and the outer walls.

The mandrel 70, used to form the flexible duct, is a cylindrical member selectively rotatable about its longitudinal axis. Preferably, the mandrel 70 winds the tape at a rate of 700 feet per minute or less. The diameter of the mandrel 70 defines the diameter of the duct 10. The surface of the mandrel includes a spiral groove 73 having a plurality of turns.

The inner wall 20 is formed from a tape 26 approximately two inches wide. The tape 26 is pulled from a spool 28 and passed over a rolling adhesive applicator 80. The tape 26 is then passed through an oven 88 to partially set, or cure the adhesive. The specific time and temperature to set-the adhesive is adhesive dependent. For the disclosed adhesive 60, six seconds at 220° F. sufficiently sets the adhesive on the tape.

The tape 26 is then wound upon the mandrel 70 such that the adhesive side is exposed. The tape 26 is wound so that consecutive turns partially overlap. The overlapping areas bond to each other so that consecutive turns form a continuous piece. The overlapping thereby allows a relatively narrow tape 26 to form a continuous wall 20.

The resilient helix 40 of wire is formed by feeding the wire about the mandrel 70. The wire is drawn from a spool 38 and engages the mandrel 70 so as to overlie the tape 26 of the inner wall 20. The wire is entrained in the spiral grooves 73 as they are expressed through the inner wall 20. That is, the inner wall 20 flexes in the area of the groove 73 to form a depression in which the wire partially sits. As the mandrel 70 rotates, the wire is drawn on in a spiral manner, thereby forming a helix 40 about the inner wall 20. The wire helix contacts the partially set adhesive 60 and bonds to the inner wall 20.

The yarn helix 50 is formed by the winding the yarn about the mandrel 70. The yarn is drawn from a spool 58 and guided to the mandrel 70 such that it is applied intermediate of the turns of the wire resilient helix 40. The yarn contacts the adhesive surface of the inner wall 20 and bonds to the inner wall. If the yarn helix includes an oscillating component, the point of application of the yarn to the mandrel is longitudinally varied with time, so as to form the oscillating component.

The outer wall 30 may be constructed from a relatively narrow tape 36 in a manner similar to the inner wall 20. The tape 36 is pulled from a spool 38 and passed over a rolling adhesive applicator 80. The tape 36 is then passed through an oven 88 to partially set or cure the adhesive. Preferably, the tapes 26, 36 forming the inner 20 and outer walls 30 are simultaneously drawn from spools 28, 38, coated with adhesive, and partially set in the oven 88. The tape 36 then engages the rotating mandrel 70 so as to overlay and bond to the inner tape 26, the wire resilient helix 40 and the yarn helix 50. Consecutive turns of the tape 36 are partially overlapped so that the consecutive turns bond to each other and form a substantially continuous outer wall.

The wire helix 40 and the yarn helix 50 are thereby bonded to the inner wall 20 and the outer wall 30, and the outer wall and the inner wall are bonded to each other in the remaining area of the common interface 25 between the inner wall and the outer wall. The bonding of the inner wall 20 and the outer wall 30 forms a substantially integral structure, wherein the helixes 40, 50 are laminated between the inner wall 20 and the outer wall 30.

Although the present invention has been described in terms of particular embodiments, it is not limited to these embodiments. Alternative embodiments and modifications which would still be encompassed by the invention may be made by those skilled in the art, particularly in light of the foregoing teachings. Alternative embodiments, modifications or equivalents may be included within the spirit and scope of the invention, as defined by the claims.

What is claimed:

1. A flexible duct of a finite length having an inlet and an outlet for conducting a fluid between the inlet and the outlet comprising:
   (a) a resilient supporting helix having a plurality of turns of substantially uniform diameter throughout the length of the duct;
   (b) a flame penetration resistant yarn helix positioned at least substantially between adjacent turns of the supporting helix for reinforcing the duct in the space between coils of the supporting helix and having a helical diameter substantially equal to the helical diameters of the supporting helix;
   (c) a flexible inner wall; and
   (d) a flexible outer wall directly bonded to the inner wall such that the resilient supporting helix and the flame penetration resistant yarn helix are sandwiched between the inner wall and outer wall.

2. The flexible duct of claim 1, wherein the position of the flame penetration resistant yarn helix oscillates between adjacent turns of the resilient supporting helix.

3. The flexible duct of claim 1, wherein the flame penetration resistant yarn helix crosses the resilient supporting helix.

4. The flexible duct of claim 1, wherein the turns of the flame penetration resistant yarn helix are between the turns of the resilient supporting helix and spaced therefrom.

5. The flexible duct of claim 1, further comprising a plurality of flame penetration resistant yarn helixes sandwiched between the inner wall and the outer wall, wherein the plurality of flame penetration resistant yarn helixes spiral in the same direction.

6. The flexible duct of claim 1, wherein the resilient supporting helix comprises a spring wire.

7. A flexible duct, comprising:
   (a) a flexible inner wall;
   (b) a flexible outer wall directly bonded to the flexible inner wall along a common interface;
   (c) a duct forming layer sandwiched between the inner wall and the outer wall at the common interface, the duct forming layer consisting of a self supporting wire helix having a substantially constant helical diameter throughout the length of the duct and a combustion and penetration resistant yarn helix at the common interface, the combustion resistant yarn helix having a helical diameter substantially equal to the helical diameter of the self supporting wire helix.

8. The flexible duct of claim 7, wherein the combustion resistant yarn helix is axially displaced from the self supporting wire helix so that the turns of the combustion resistant yarn helix are intermediate of the turns of the self supporting wire helix.

9. A flexible duct for conducting a fluid along a given length, comprising:
   (a) a flexible inner wall having an internal surface exposed to the fluid and an outer bonding surface;
   (b) a self supporting resilient helix extending substantially the length of the duct, the self supporting resilient helix having a helical diameter substantially equal to the diameter of the inner wall;
   (c) a fire resistant yarn helix extending substantially the length of the duct, the fire resistant yarn helix having a helical diameter substantially equal to the helical diameter of the self supporting resilient helix; and
   (d) an outer flexible wall having an exterior surface and a mating surface, wherein the mating surface is bonded to the bonding surface of the inner wall to form a common interface such that the self supporting resilient helix and the fire resistant yarn helix lie at the common interface.

10. The flexible duct of claim 9, wherein the fire resistant yarn helix is axially displaced from the self supporting resilient helix so that the turns of the fire resistant yarn helix are intermediate of the turns of the self supporting resilient helix.

11. A flexible duct comprising:
   (a) a flexible inner wall;
   (b) a flexible outer wall bonded to the inner wall; and
   (c) means sandwiched between the inner wall and the outer wall for providing structural rigidity and resistance to flame penetration, the means comprising a self supporting resilient helix and a flame penetration resistant yarn helix such that the turns of the flame penetration resistant yarn helix are intermediate of the turns of the self supporting resilient helix.

12. A flexible duct for conducting a fluid, comprising:
   (a) a flexible inner wall providing a substantially impervious barrier to the fluid being conducted;
   (b) a self supporting resilient helix wound about the inner wall;
   (c) a non-metallic fire resistant yarn helix wound about the inner wall and axially displaced from the self supporting resilient helix such that the turns of the fire resistant yarn helix are intermediate of the turns of the self supporting wire helix; and
   (d) a flexible outer wall bonded to the inner wall so as to sandwich the self supporting resilient helix and the fire resistant yarn helix between the inner and the outer wall.

13. A flexible duct for conducting fluids, comprising:
   (a) a resilient self supporting helix having a plurality of turns for providing structural rigidity to the duct;
   (b) a sufficient number of flame penetration resistant yarn helixes wound at least substantially in the space between turns of the self-supporting helix to satisfy the claim penetration test as set forth by the Underwriters Laboratories 181 Standard for Class 1 Factory Made Air Ducts and Air Connectors;

(c) a flexible outer wall bonded to the inner wall, so as to sandwich the self supporting resilient helix and the flame penetration resistant yarn helix between the inner and outer walls.

14. The flexible duct of claim 13 wherein the flame penetration resistant yarn helix and the self supporting resilient helix spiral in the same direction.

15. The flexible duct of claim 13 wherein the flame penetration resistant yarn helix and the self supporting resilient helix spiral in opposite directions.

16. The flexible duct of claim 13 wherein the number of flame penetration resistant yarn helixes is three.

* * * * *